US 11,958,553 B2

(12) United States Patent
Miyashita et al.

(10) Patent No.: US 11,958,553 B2
(45) Date of Patent: Apr. 16, 2024

(54) WORKING VEHICLE

(71) Applicant: KUBOTA CORPORATION, Osaka (JP)

(72) Inventors: Shunsuke Miyashita, Sakai (JP); Yasuaki Morioka, Sakai (JP); Kunihiko Nishino, Sakai (JP); Kumiko Kobayashi, Sakai (JP); Misako Kawai, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 680 days.

(21) Appl. No.: 17/141,266

(22) Filed: Jan. 5, 2021

(65) Prior Publication Data

US 2021/0146995 A1 May 20, 2021

Related U.S. Application Data

(63) Continuation of application No. PCT/JP2019/024909, filed on Jun. 24, 2019.

(30) Foreign Application Priority Data

Jul. 11, 2018 (JP) .................................. 2018-131239

(51) Int. Cl.
| | |
|---|---|
| *A01B 63/00* | (2006.01) |
| *A01B 63/02* | (2006.01) |
| *A01B 69/00* | (2006.01) |
| *B62D 1/04* | (2006.01) |
| *B62D 6/00* | (2006.01) |

(Continued)

(52) U.S. Cl.
CPC ................. *B62D 6/00* (2013.01); *A01B 63/02* (2013.01); *A01B 69/004* (2013.01); *B62D 1/046* (2013.01); *B62D 15/025* (2013.01); *A01B 59/066* (2013.01)

(58) Field of Classification Search
USPC ........................................ 701/36, 41–44, 50
See application file for complete search history.

(56) References Cited

U.S. PATENT DOCUMENTS

| | | | | |
|---|---|---|---|---|
| 5,092,422 A | * | 3/1992 | Hood, Jr. | ............ B62D 49/0607 |
| | | | | 172/306 |
| 8,060,299 B2 | * | 11/2011 | Gharsalli | ............. G05D 1/0278 |
| | | | | 701/425 |
| 9,702,115 B1 | * | 7/2017 | Darukhanavala | ....... E02F 9/205 |

(Continued)

FOREIGN PATENT DOCUMENTS

| | | |
|---|---|---|
| JP | 56-85514 U | 7/1981 |
| JP | 06-48226 A | 2/1994 |

(Continued)

OTHER PUBLICATIONS

Official Communication issued in International Patent Application No. PCT/JP2019/024909, dated Jul. 30, 2019.

*Primary Examiner* — Jonathan L Sample
(74) *Attorney, Agent, or Firm* — Keating & Bennett, LLP

(57) ABSTRACT

A working vehicle includes a steering device to steer a vehicle body, a working device connected to the vehicle body, an automatic steering controller to perform automatic steering of the steering device based on a difference between a scheduled traveling line and a position of the vehicle body, and a parameter changer to change a control parameter of the automatic steering depending on the working device connected to the vehicle body.

10 Claims, 18 Drawing Sheets

(51) Int. Cl.
*B62D 15/02* (2006.01)
*A01B 59/06* (2006.01)

(56) References Cited

U.S. PATENT DOCUMENTS

| | | | | |
|---|---|---|---|---|
| 10,144,453 | B2* | 12/2018 | Bunderson | G05D 1/0217 |
| 2003/0187577 | A1* | 10/2003 | McClure | G05D 1/0278 |
| | | | | 701/50 |
| 2006/0041354 | A1* | 2/2006 | Schick | G05D 1/0278 |
| | | | | 701/472 |
| 2006/0282205 | A1* | 12/2006 | Lange | A01B 69/008 |
| | | | | 701/50 |
| 2008/0195268 | A1* | 8/2008 | Sapilewski | A01B 69/004 |
| | | | | 701/23 |
| 2008/0208461 | A1* | 8/2008 | Gharsalli | G05D 1/0278 |
| | | | | 701/425 |
| 2010/0023229 | A1* | 1/2010 | Chiocco | A01B 69/003 |
| | | | | 701/50 |
| 2019/0143813 | A1* | 5/2019 | Ono | B60W 10/06 |
| | | | | 477/71 |
| 2021/0146995 | A1* | 5/2021 | Miyashita | B62D 15/025 |

FOREIGN PATENT DOCUMENTS

| | | |
|---|---|---|
| JP | 2006-232142 A | 9/2006 |
| JP | 2017-123803 A | 7/2017 |

* cited by examiner

FIG.3A

| Number of operations | Correction amount (cm) ||
| --- | --- | --- |
| | Left correction amount | Right correction amount |
| 1 | 2 | 2 |
| 2 | 4 | 4 |
| 3 | 6 | 6 |
| 4 | 8 | 8 |
| 5 | 10 | 10 |
| ... | ... | ... |

| Operation extent (Displacement) | Correction amount (cm) | |
|---|---|---|
| | Left correction amount | Right correction amount |
| 5 mm | 2 | 2 |
| 10 mm | 4 | 4 |
| 15 mm | 6 | 6 |
| 20 mm | 8 | 8 |
| 25 mm | 10 | 10 |
| ... | ... | ... |

FIG.3B

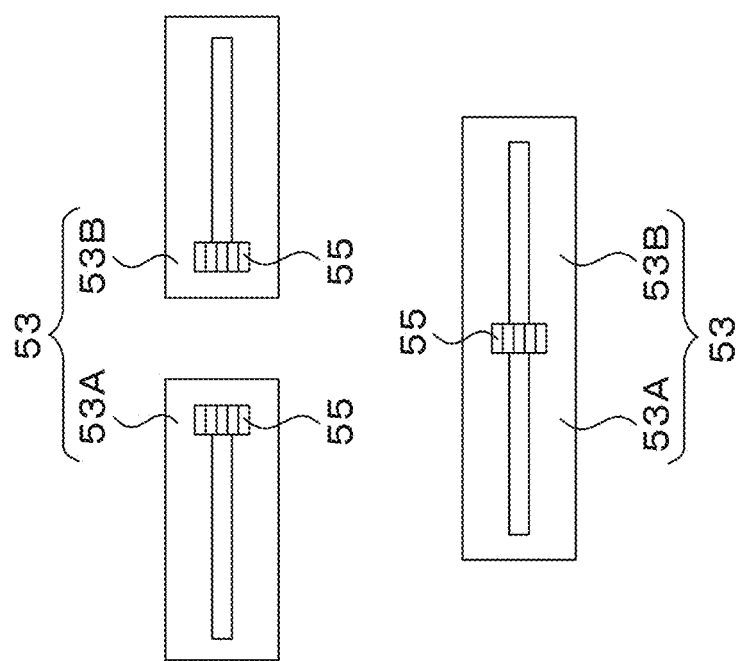

FIG.13

| Lift arm height(%) | Control parameter (Control gain) |
|---|---|
| 100% | 0.7 |
| ⋮ | ⋮ |
| 50% | 1 |
| ⋮ | ⋮ |
| 20% | 1.2 |
| ⋮ | ⋮ |

WORKING VEHICLE

CROSS REFERENCE TO RELATED APPLICATIONS

This application is a continuation application of International Application No. PCT/JP2019/024909, filed on Jun. 24, 2019, which claims the benefit of priority to Japanese Patent Application No. 2018-131239, filed on Jul. 11, 2018. The entire contents of each of these applications are hereby incorporated herein by reference.

BACKGROUND OF THE INVENTION

1. Field of the Invention

The present invention relates to a working vehicle.

2. Description of the Related Art

Japanese Unexamined Patent Publication No. 2017-123803 discloses a conventional agricultural working machine.

The agricultural working machine of Japanese Unexamined Patent Publication No. 2017-123803 is provided with a traveling body capable of switching between manual traveling by manual steering and automatic traveling by automatic steering along a set traveling line parallel to a reference traveling line, and a changeover switch capable of switching between the manual traveling and the automatic traveling. In addition, the agricultural working machine sets a starting point of the reference traveling line after pressing a right indicator button while traveling along ridges, and sets an end point of the reference traveling line by pressing a left indicator button while traveling. That is, the reference traveling line is set before the automatic steering.

SUMMARY OF THE INVENTION

A working vehicle includes a steering device to steer a vehicle body, a working device connected to the vehicle body, an automatic steering controller to perform automatic steering of the steering device based on a difference between a scheduled traveling line and a position of the vehicle body, and a parameter changer to change a control parameter of the automatic steering depending on the working device connected to the vehicle body.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3A is an explanation view explaining a correction amount in a push switch.

FIG. 3B is an explanation view explaining a correction amount in a sliding switch.

FIG. 4B is a view illustrating a first corrector portion and a second corrector portion in a sliding switch.

FIG. 8 is a view illustrating a lifter device and the like.

FIG. 13 is a view illustrating an example of a conversion table.

DETAILED DESCRIPTION OF THE PREFERRED EMBODIMENTS

Figure 1:
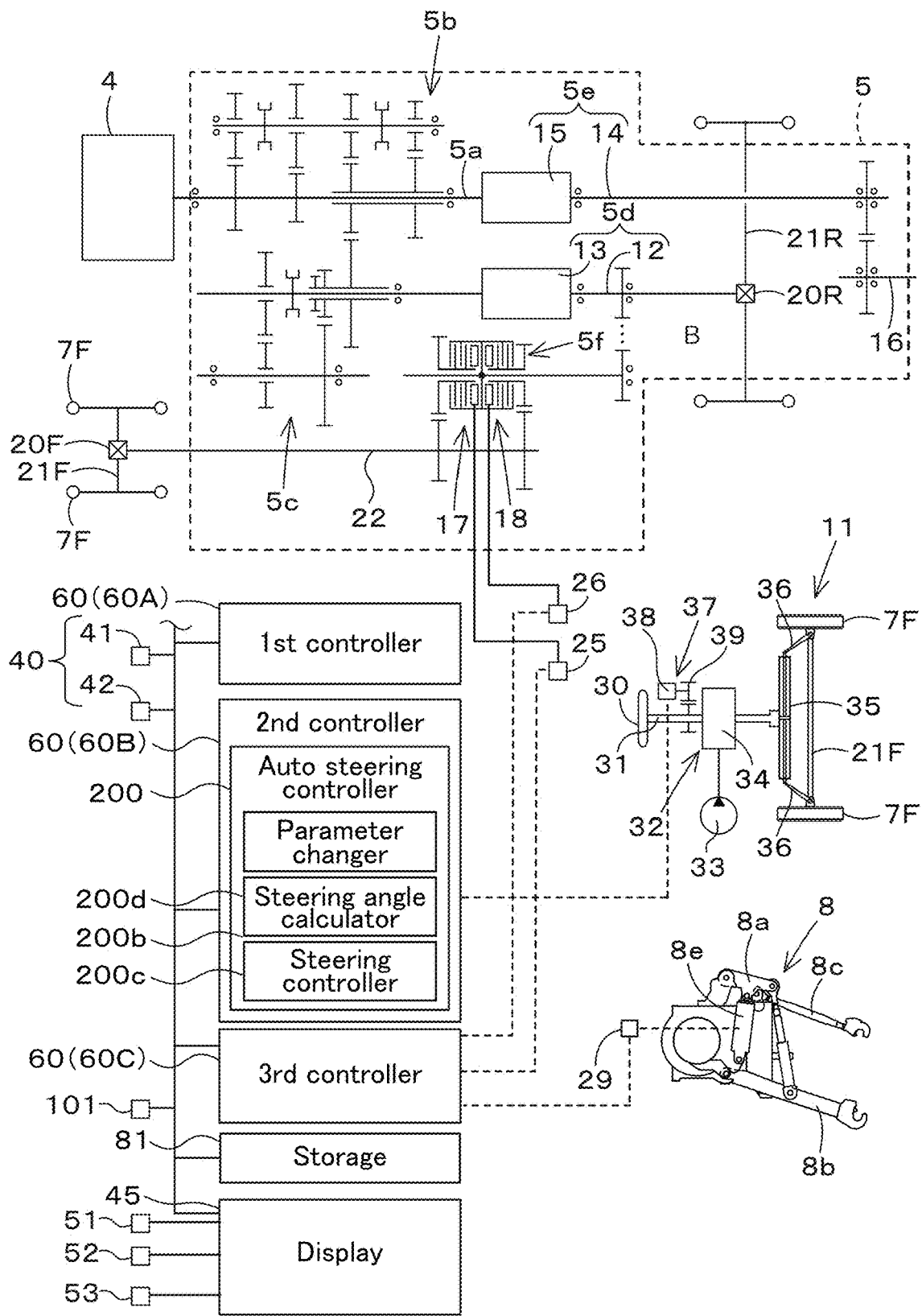
FIG. 1 is a view illustrating a control block diagram and configuration of a tractor.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, preferred embodiments of the present invention will be described with appropriate reference to the drawings.

Figure 14:
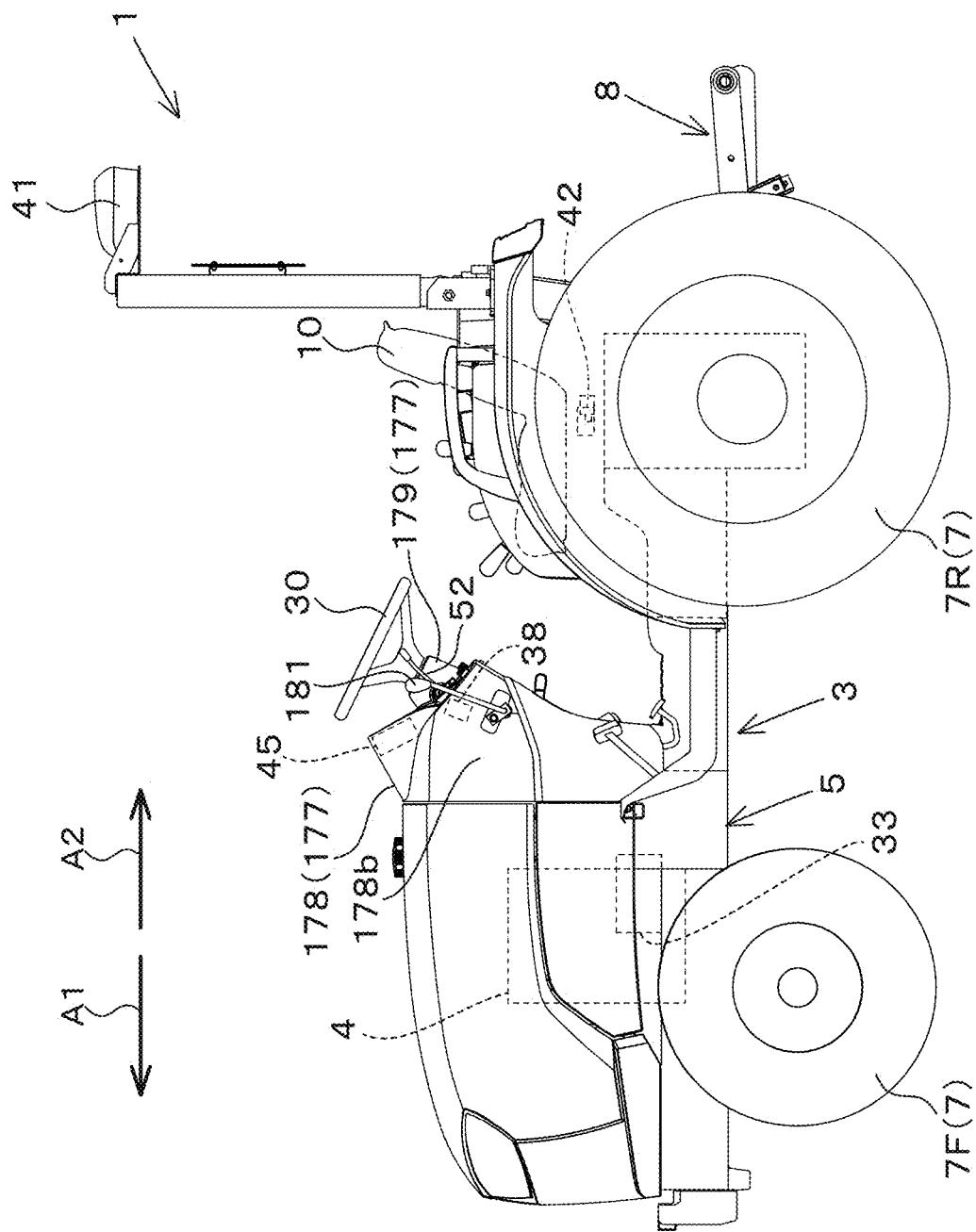
FIG. 14 is a whole view of a tractor.

FIG. 14 is a side view illustrating a preferred embodiment of the working vehicle 1, and FIG. 14 is a plan view illustrating the embodiment of the working vehicle 1. In this preferred embodiment, the working vehicle 1 is a tractor. However, the working vehicle 1 is not limited to a tractor and may be an agricultural machine (agricultural vehicle) such as a combine or a transplanter, or construction equipment (construction vehicle) such as a loader working machine.

In the following description, the front side of an operator seated on an operator seat 10 of the tractor (working vehicle) 1 (a direction of an arrowed line A1 in FIG. 14) will be referred to as the front, the rear side of the operator (a direction of an arrowed line A2 in FIG. 14) will be referred to as the rear, the left side of the operator will be referred to as the left, and the right side of the operator will be referred to as the right. The horizontal direction, which is a direction orthogonal to the front-to-back direction of the working vehicle 1, is referred to as a vehicle width direction.

As shown in FIG. 14, the tractor 1 is provided with a vehicle body 3, a prime mover 4, and a speed-shifter device 5. The vehicle body 3 includes a traveling device 7, which allows the vehicle body 3 to travel. The traveling device 7 includes a front wheel 7F and a rear wheel 7R. The front wheels 7F may be tire-type or crawler-type. The rear wheels 7R also may be tire-type or crawler-type.

The prime mover 4 includes a diesel engine, an electric motor or the like, the prime mover 4 includes the diesel engine in this preferred embodiment. The speed-shifter device 5 is capable of switching the propulsion of the traveling device 7 by shifting gears and also of switching the traveling device 7 between the forward traveling and the backward traveling. The vehicle body 3 is provided with the operator seat 10.

The rear portion of the vehicle body 3 is provided with a coupler portion including a lifter device 8 and including a three-point linkage mechanism or the like. A working device can be attached to and detached from the coupler portion 8. By connecting the working device to the coupler portion 8, the working device can be towed by the vehicle body 3. The working device includes a cultivator device for tilling, a fertilizer sprayer device for spraying fertilizer, a pesticide sprayer device for spraying pesticides, a harvester device for harvesting, a mower device for harvesting grasses and the like, a tedder device for diffusing grasses and the like, a raking device for collecting grasses and the like, and a baler device for molding grasses and the like.

As shown in FIG. 1, the speed-shifter device 5 is provided with a main shaft (propulsion shaft) 5a, a main speed-shifter portion 5b, a sub speed-shifter portion 5c, a shuttle portion 5d, a PTO power transmission 5e, and a front speed-shifter portion 5f. The propulsion shaft 5a is rotatably supported in a housing case (transmission case) of the speed-shifter device 5, and power from the crankshaft of the prime mover 4 is transmitted to the propulsion shaft 5a. The main speed-shifter portion 5b includes a plurality of gears and a shifter to change the engagement of the gears. The main speed-shifter portion 5b changes the rotation input from the propulsion shaft 5a and outputs (shifts the speed) by changing the connection (engagement) of the plurality of gears with the shifter accordingly.

The sub speed-shifter portion 5c, like the main speed-shifter portion 5b, includes a plurality of gears and a shifter to change the engagement of the gears. By changing the connection (engagement) of the plurality of gears with the shifter as appropriate, the sub speed-shifter portion 5c changes the rotation input from the main speed-shifter portion 5b and outputs the changed rotation (speed shifting).

The shuttle portion 5d includes a shuttle shaft 12 and a forward/backward switching portion 13. The power output from the sub speed-shifter portion 5c is transmitted to the shuttle shaft 12 via gears and other devices. The forward/backward switching portion 13 includes, for example, a hydraulic clutch or the like, and switches the direction of rotation of the shuttle shaft 12, that is, the forward movement and backward movement of the tractor 1, by engaging and disengaging the hydraulic clutch. The shuttle shaft 12 is connected to a rear wheel differential device 20R. The rear wheel differential device 20R rotatably supports the rear axle 21R on which the rear wheel 7R is mounted.

The PTO power transmission 5e includes a PTO propulsion shaft 14 and a PTO clutch 15. The PTO propulsion shaft 14 is rotatably supported, and the power from the propulsion shaft 5a can be transferred from the propulsion shaft 5a. The PTO propulsion shaft 14 is connected to the PTO shaft 16 via the gears and the like. The PTO clutch 15 includes, for example, a hydraulic clutch and the like, and is switched between a state where the power of the propulsion shaft 5a is transferred to the PTO propulsion shaft 14 and a state where the power of the propulsion shaft 5a is not transferred to the PTO propulsion shaft 14.

The front speed-shifter device 5f includes a first clutch 17 and a second clutch 18. The first clutch 17 and the second clutch are capable of transmitting power from the propulsion shaft 5a, for example, the power of the shuttle shaft 12 is transmitted via the gears and the transmission shaft. The power from the first clutch 17 and the second clutch 18 can be transmitted to the front axle 21F via the front transmission shaft 22. In particular, the front transmission shaft 22 is connected to a front wheel differential device 20F, which rotatably supports the front axle 21F on which the front wheels 7F are mounted.

The first clutch 17 and the second clutch 18 include a hydraulic clutch or the like. A fluid line is connected to the first clutch 17, and the fluid line is connected to a first actuator valve 25, to which the hydraulic fluid discharged from the hydraulic pump is supplied. The first clutch 17 is switched between a engaged state and a disengaged state depending on the degree of opening of the first actuator valve 25. A fluid line is connected to the second clutch 18, and the fluid line is connected to a second actuator valve 26. The second clutch 18 is switched between an engaged state and a disengaged state depending on the degree of opening of the second actuator valve 26. The first and second actuation valves 25 and 26 are, for example, two-position switching valves with solenoid valves, which are switched to an engaged state or a disengaged state by magnetization or demagnetization of the solenoid valve solenoids.

When the first clutch 17 is disengaged and the second clutch 18 is engaged, the power of the shuttle shaft 12 is transmitted to the front wheels 7F through the second clutch 18. This results in four-wheel driving (4WD) in which the front and rear wheels are driven by the power and the rotation speed of the front and rear wheels is substantially the same (4WD constant speed state). On the other hand, when the first clutch 17 is engaged and the second clutch 18 is disengaged, four-wheel driving is provided and the rotation speed of the front wheel becomes higher than that of the rear wheel (4WD constant speed state). When the first and second clutches 17 and 18 are disengaged, the power of the shuttle shaft 12 is not transmitted to the front wheels 7F, and thus the vehicle becomes two-wheel drive (2WD) with the rear wheels driven by power.

Figure 8:
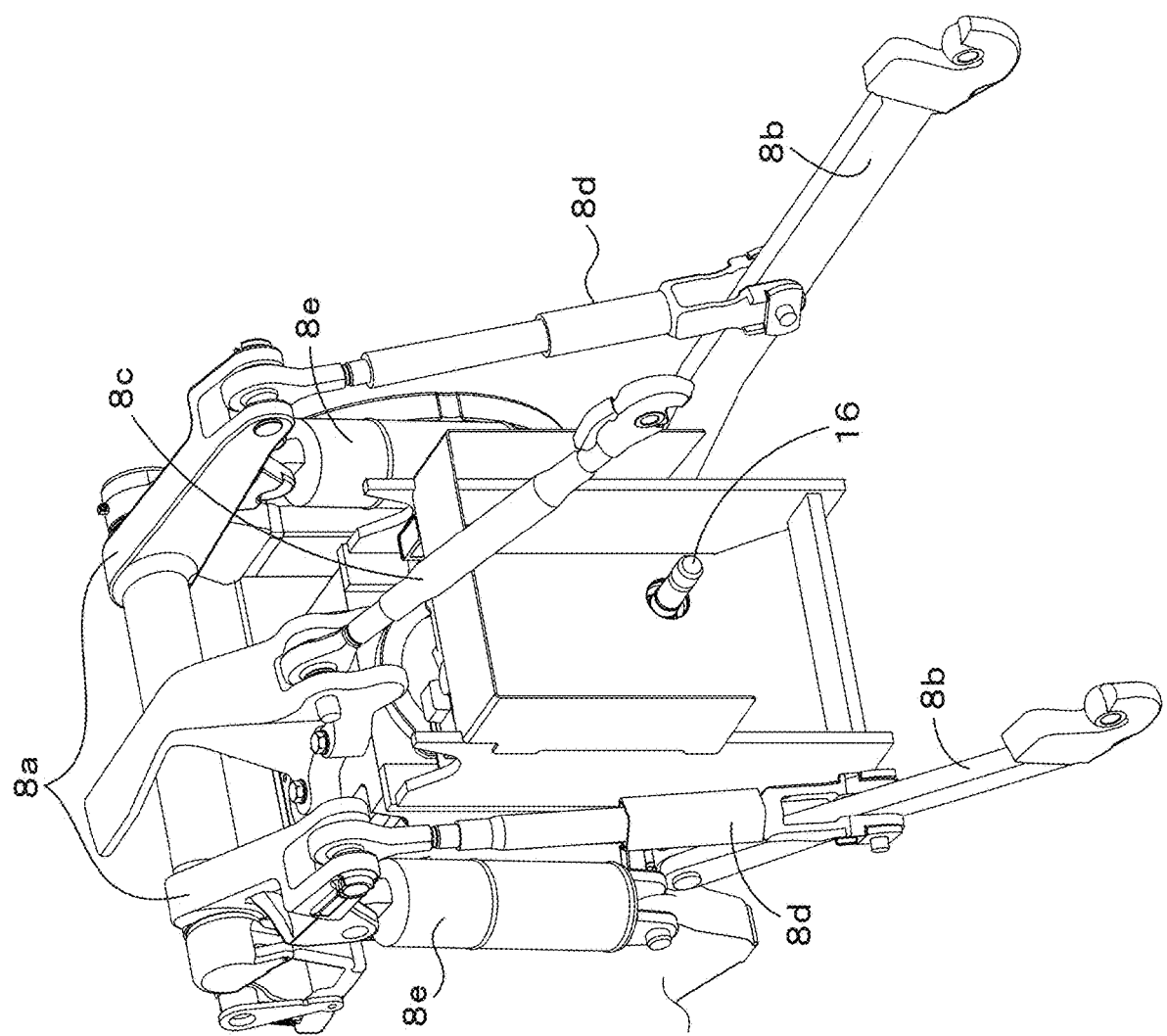

As shown in FIG. 8, the lifter device 8 includes a lift arm 8a, a lower link 8b, a top link 8c, a lift rod 8d, and a lift cylinder 8e. The front end of the lift arm 8a is pivotally supported upwardly or downwardly in the upper rear portion of the case (transmission case) housing the speed-shifter device 5. The lift arm 8a is pivoted (raised and lowered) by activating the lift cylinder 8e. The lift cylinder 8e includes a hydraulic cylinder. The lift cylinder 8e is connected to a hydraulic pump via a control valve 29. The control valve 29 is a solenoid valve or the like, which stretches and shortens the lift cylinder 8e.

The front end portion of the lower link 8b is pivotally supported upwardly or downwardly on the rear bottom portion of the speed-shifter device 5. The front end portion of the top link 8c is pivotally supported upwardly or downwardly on the rear portion of the speed-shifter device 5 above the lower link 8b. A lift rod 8d connects the lift arm 8a to the lower link 8b. A working device 2 is connected to the rear portion of the lower link 8b and the rear portion of the top link 8c. When the lift cylinder 8e is driven (stretched), the lift arm 8a is raised and lowered, and the lower link 8b connected to the lift arm 8a via the lift rod 8d is raised and lowered. This causes the working device 2 to pivot upward or downward (raise or lower) with the front of the lower link 8b as the fulcrum.

The tractor 1 is provided with a positioning device 40. The positioning device 40 is capable of detecting its own position (positioning information including latitude and longitude) by a satellite positioning system (positioning satellite) such as D-GPS, GPS, GLONASS, HOKUTO, GALILEO, MICHIBIKI, and the like. That is, the positioning device 40 receives satellite signals transmitted by the positioning satellite (such as the position of the positioning satellite, transmission time, correction information, and the like) and detects its position (for example, latitude and longitude) based on the satellite signals. The positioning device 40 includes a receiver device 41 and an inertial measurement device (IMU: Inertial Measurement Unit) 42. The receiver device 41 includes an antenna or the like and receives satellite signals transmitted from a positioning satellite, and is attached to the vehicle body 3 separately from the inertial measurement unit 42. In this preferred embodiment, the receiver device 41 is attached to a ROPS provided to the vehicle body 3. The attachment location of the receiver device 41 is not limited to that of this preferred embodiment.

The inertial measurement device 42 includes an acceleration sensor to detect acceleration, a gyroscope to detect angular velocity, and so forth. The vehicle body 3, for example, is installed below the operator seat 10, and the roll angle, pitch angle, yaw angle, and the like of the vehicle body 3 can be detected by the inertial measurement device 42.

As shown in FIG. 1, the tractor 1 is provided with a steering device 11. The steering device 11 is capable of performing manual steering to steer the body of the vehicle body 3 by the operator and automatic steering to steer the body of the vehicle body 3 automatically without the operator's operation.

The steering device 11 includes a steering handle (steering wheel) 30 and a steering shaft (rotating shaft) 31 that rotatably supports the steering handle 30. The steering device 11 also includes an assist mechanism (power steering device) 32. The assist mechanism 32 assists the rotation of the steering shaft 31 (steering handle 30) by hydraulic or other means. The assist mechanism 32 includes a hydraulic pump 33, a control valve 34 to which the hydraulic fluid discharged from the hydraulic pump 33 is supplied, and a steering cylinder 35 operated by the control valve 34. The control valve 34 is, for example, a three-position switching valve that can be switched by movement of a spool or the like, and is switched in response to the steering direction (direction of rotation) of the steering shaft 31. The steering cylinder 35 is connected to an arm (knuckle arm) 36 that changes the direction of the front wheels 7F.

Thus, when the operator grasps the steering wheel 30 and operates the steering wheel 30 in one direction or the other, the switching position and opening degree of the control valve 34 will be switched according to the direction of rotation of the steering wheel 30, and the steering cylinder 35 will stretch and shorten to the left or right according to the switching position and opening degree of the control valve 34. The direction of steering of the front wheels 7F can be changed by the steering wheel 30. In other words, the vehicle body 3 can change the direction of travel to the left or right by manual steering of the steering handle 30.

Next, automatic steering will be explained.

Figure 2:
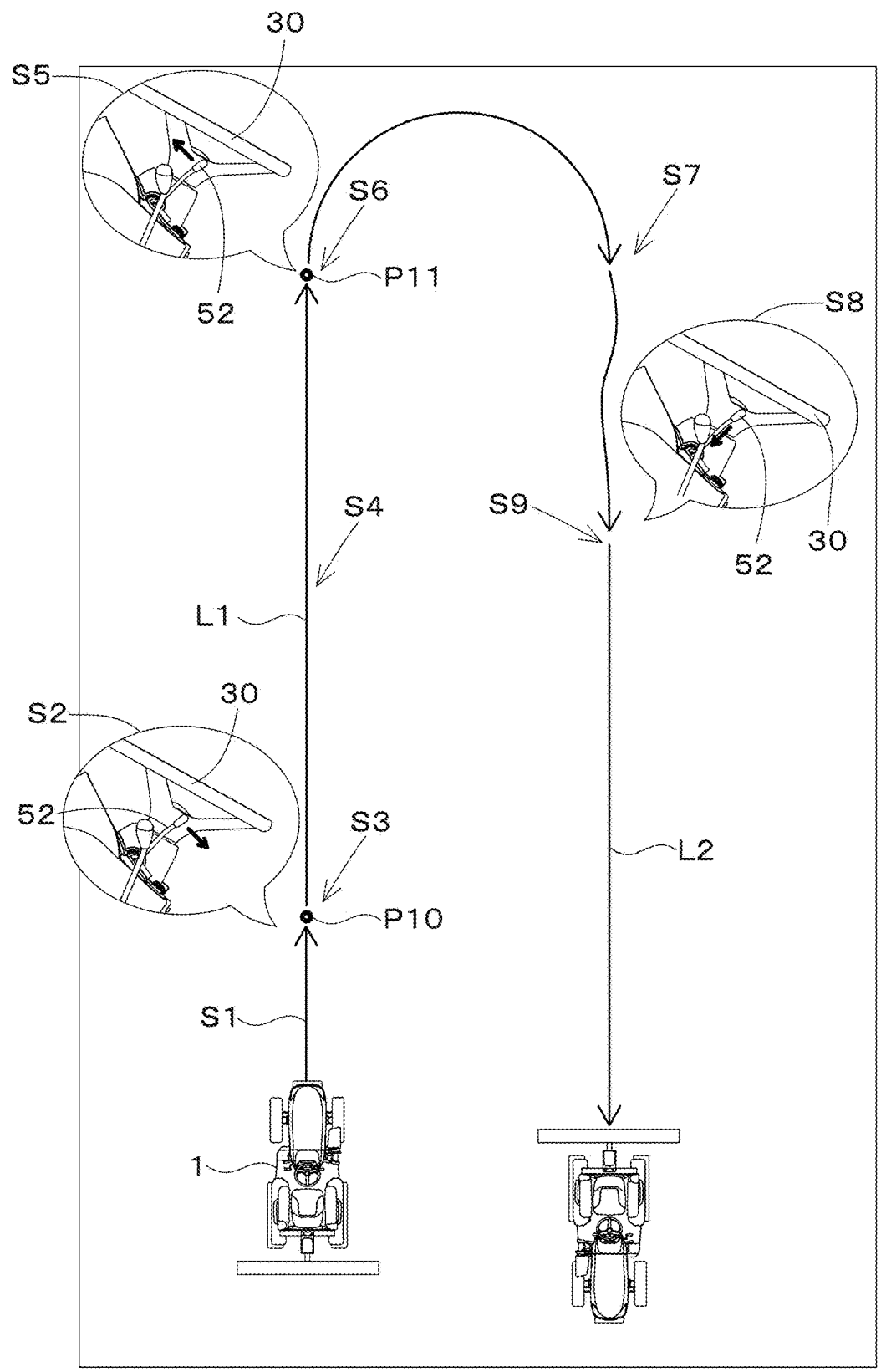
FIG. 2 is an explanation view explaining automatic steering.

As shown in FIG. 2, when automatic steering is performed, first, a traveling reference line L1 is set before automatic steering is performed. After the traveling reference line L1 is set, the automatic steering can be performed by setting the scheduled traveling line L2, which is parallel to the traveling reference line L1. The automatic steering automatically steers the tractor 1 (vehicle body 3) in the direction of traveling so that the vehicle position measured by the positioning device 40 and the scheduled traveling line L2 coincide.

In particular, when the tractor 1 (vehicle body 3) is moved to a predetermined position in the work field prior to the automatic steering (S1), and at the predetermined position, the operator operates the steering changeover switch 52 provided on the tractor 1 (step S2), the vehicle position measured by the positioning device 40 is set at the start point P10 of the traveling reference line L1 (step S3). When the tractor 1 (vehicle body 3) is moved from the start point P10 of the traveling reference line L1 (step S4) and the operator operates the steering changeover switch 52 at the predetermined position (step S5), the vehicle position measured by the positioning device 40 is set at the end point P11 of the traveling reference line L1 (step S6). Thus, a straight line connecting the start point P10 and the end point P11 is set as the traveling reference line L1.

After setting the traveling reference line L1 (after step S6), for example, when the tractor 1 (vehicle body 3) is moved to a different location than where the traveling reference line L1 was set (step S7) and the operator operates the steering changeover switch 52 (step S8), the scheduled traveling line L2, which is a straight line parallel to the traveling reference line L1, is set (step S9). After the scheduled traveling line L2 is set, the automatic steering is started and the direction of traveling of the tractor 1 (vehicle body 3) is changed so that it follows the scheduled traveling line L2. For example, when the current vehicle position is on the left side of the scheduled traveling line L2, the front wheel 7F is steered to the right, and when the current vehicle position is on the right side of the scheduled traveling line L2, the front wheel 7F is steered to the left. During the automatic steering, the travel speed (vehicle speed) of the tractor 1 (vehicle body 3) can be changed by the operator manually changing the amount of operation of the gas pedal members (accelerator pedal and gas pedal lever) provided in the tractor 1, or by changing the gear shift of the speed shifter (transmission).

After the start of the automatic steering, the automatic steering can be terminated when the operator operates the steering changeover switch 52 at any point. That is, the end point of the scheduled traveling line L2 can be set by the end of the automatic steering by operating the steering changeover switch 52. In other words, the length of the end point of the scheduled traveling line L2 can be set longer or shorter than the traveling reference line L1. In other words, the scheduled traveling line L2 is not associated with the length of the traveling reference line L1, and the scheduled traveling line L2 allows the vehicle to travel a longer distance than the length of the traveling reference line L1 under the automatic steering.

As shown in FIG. 1, the steering device 11 includes an automatic steering mechanism 37. The automatic steering mechanism performs automatic steering of the vehicle body 3 and automatically steers the vehicle body 3 based on the position of the vehicle body 3 (vehicle position) detected by the positioning device 40. The automatic steering mechanism 37 is provided with a steering motor 38 and a gear mechanism 39. The steering motor is a motor whose rotational direction, rotational speed, rotational angle, and the like can be controlled based on the vehicle position. The gear mechanism 39 includes a gear provided on the steering shaft 31 and traveling in conjunction with the steering shaft 31, and a gear provided on the rotation shaft of the steering motor 38 and traveling in conjunction with the rotation shaft of the steering motor 38. When the rotation shaft of the steering motor 38 rotates, the steering shaft 31 automatically rotates (revolves) via the gear mechanism 39 to change the steering direction of the front wheels 7F so that the vehicle position coincides with the scheduled traveling line L2.

As shown in FIG. 1, the tractor 1 is provided with a display device 45. The display device 45 is capable of displaying various information about the tractor 1, at least the operation information of the tractor 1. The display device 45 is located in front of the operator seat 10.

As shown in FIG. 1, the tractor 1 is provided with a setter switch 51. The setter switch 51 switches to a setting mode that is set at least prior to the start of the automatic steering. The setting mode is a mode for making various settings related to the automatic steering before starting the automatic steering, for example, setting a start and end point of the traveling reference line L1.

The setter switch 51 is switchable to ON or OFF, and outputs a signal that the setting mode is enabled when it is ON, and outputs a signal that the setting mode is disabled when it is OFF. The setter switch 51 also outputs a signal to the display device 45 that the setting mode is enabled when it is ON, and outputs a signal to the display device 45 that the setting mode is disabled when it is OFF.

The tractor 1 is provided with the steering changeover switch 52. The steering changeover switch 52 switches the start or end of the automatic steering. In particular, the steering changeover switch 52 is switchable from the neutral position to up, down, forward, or backward, and issues a start of the automatic steering when switched downward from the neutral position with the setting mode enabled, and issues an end of the automatic steering when switched upward from the neutral position with the setting mode enabled. The steering changeover switch 52 also issues to set the current vehicle position to the start point P10 of the traveling reference line L1 when switched from the neutral position to the rear with the setting mode enabled, and the steering changeover switch 52 issues to set the current vehicle position to the end point P11 of the traveling reference line L1 when switched from the neutral position to the front with the setting mode enabled. That is, the steering changeover switch 52 defines and functions as both of a traveling reference line setter switch to set the start position (start point P10) of the traveling reference line L1 and a traveling reference line setter switch to set the end position (end point P11) of the traveling reference line L1. The steering changeover switch 52 may be separate from the traveling reference line setter switch and the steering changeover switch 52, which switches the start or end of the automatic steering.

The tractor 1 is provided with a corrector switch 53. The corrector switch 53 corrects the vehicle position (latitude and longitude) measured by the positioning device 40. That is, the corrector switch 53 corrects the vehicle position (called the calculated vehicle position) calculated with the satellite signal (position of the positioning satellite, transmission time, correction information, and the like) and the measurement information (acceleration, angular velocity) measured by the inertial measurement device 42.

The corrector switch 53 includes a push switch or a slide switch, which can be pressed or slidable. Hereinafter, a case in which the corrector switch 53 is a push switch and a case in which the corrector switch 53 is a slide switch respectively will be described.

When the corrector switch 53 is a push switch, the correction amount is set based on the number of operations of the push switch. The correction amount is determined by the following formula: correction amount=number of operations×correction amount per operation count. For example, as shown in FIG. 3A, each operation of the push switch increases the amount of correction by a few centimeters or tens of centimeters. The number of operations of the push switch is input to the first controller device 60A, and the first controller device 60A sets (calculates) the correction amount based on the number of operations.

When the corrector switch 53 is a slide switch, the amount of correction is set based on the amount of operation (displacement amount) of the slide switch. For example, the correction amount is determined by the correction amount=the amount of displacement from a predetermined position. For example, as shown in FIG. 3B, for every 5 mm increase in the displacement of the slide switch, the amount of correction is increased by a few centimeters or tens of centimeters. The amount of operation of the slide switch (displacement amount) is input to the first controller device 60A, and the first controller device 60A sets (calculates) the correction amount based on the displacement amount. The method of increasing the correction amount and the rate of increase is not limited to the values described above.

Figure 4A:
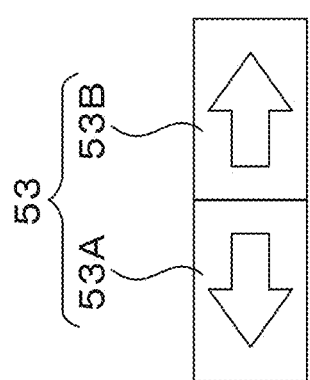
FIG. 4A is a view illustrating a first corrector portion and a second corrector portion in a push switch.

In detail, as shown in FIGS. 4A and 4B, the corrector switch 53 includes a first corrector portion 53A and a second corrector portion 53B. The first corrector portion 53A commands correction of the vehicle position corresponding to one side, that is, the left side, of the vehicle body 3 in the width direction. The second corrector portion 53B commands correction of the vehicle position corresponding to the other side in the width direction of the vehicle body 3, that is, the right side.

As shown in FIG. 4A, when the corrector switch 53 is a push switch, the first corrector portion 53A and the second corrector portion 53B are on or off switches that automatically return at each operation. The switch including the first corrector portion 53A and the switch including the second corrector portion 53B are integrated with the switch including the first corrector portion 53A. The switch including the first corrector portion 53A and the switch including the second corrector portion 53B may be disposed apart from each other. As shown in FIG. 3A, each time the first corrector portion 53A is pressed, the amount of correction corresponding to the left side of the vehicle body 3 (the left correction amount) is increased. Also, each time the second corrector portion 53B is pressed, the amount of correction corresponding to the right side of the vehicle body 3 (the right correction amount) increases.

As shown in FIG. 4B, when the corrector switch 53 is a slide switch, the first and second corrector portions 53A and 53B include a pinching portion 55 that moves left or right along the longitudinal direction of the long hole. When the corrector switch 53 is a slide switch, the first and second corrector portions 53A and 53B are disposed apart from each other in the width direction. As shown in FIG. 3B, when the pinching portion 55 is gradually displaced to the left side from the predetermined reference position, the left correction amount increases in accordance with the displacement amount. When the pinching portion 55 is gradually displaced to the right side from the predetermined reference position, the right correction amount increases in accordance with the displacement amount. As shown in FIG. 4B, in the case of a slide switch, the first corrector portion 53A and the second corrector portion 53B are integrated, and the reference position of the pinching portion 55 is set at the center, and when the pinching portion 55 is displaced to the left from the reference position, the left correction amount is set, and when the pinching portion 55 is displaced to the right from the middle position, the right correction amount is set.

Next, the relation between the correction amount (left and right correction amounts) by the corrector switch 53, the scheduled traveling line L2, and the behavior of the tractor 1 (vehicle body 3) (traveling trajectory) will be explained.

Figure 5A:
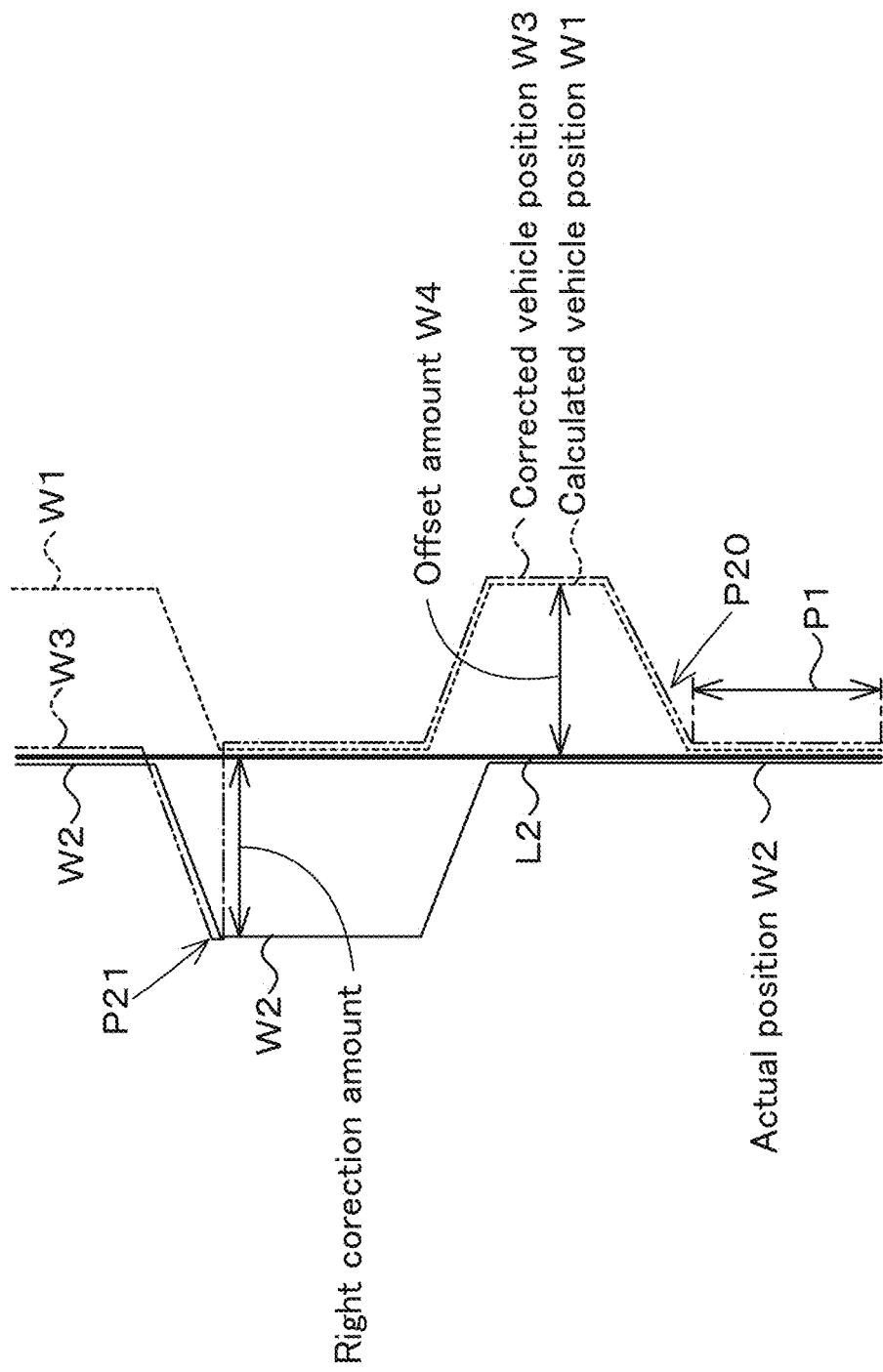
FIG. 5A is a view illustrating a state where a calculated body position is offset rightward during straight traveling in automatic steering.

FIG. 5A shows the situation when the calculated vehicle position W1 shifts to the right during the automatic steering and straight ahead. As shown in FIG. 5A, when the automatic steering is started and the actual position of the tractor 1 (vehicle body 3) (actual position W2) is the same as the calculated vehicle position W1, and the actual position W2 is the same as the scheduled traveling line L2, the tractor 1 will travel along the scheduled traveling line L2. That is, in the sector P1 where there are no errors in the positioning of the positioning device 40 and the vehicle position (calculated vehicle position W1) detected by the positioning device 40 is the same as the actual position W2, the tractor 1 travels along the scheduled traveling line L2. When there are no errors in positioning by the positioning system 40 and no corrections are made, the calculated vehicle position W1 is the same as the corrected vehicle position (corrected vehicle position) W3, corrected by the correction amount. The corrected vehicle position W3 is calculated by the following formula: corrected vehicle position W3=calculated vehicle position W1−correction amount.

Here, in the vicinity of the position P20, although the actual position W2 is not out of alignment with the scheduled traveling line L2, various effects cause errors in positioning by the positioning device 40, and the vehicle position W1 detected by the positioning device 40 is shifted to the right side with respect to the scheduled traveling line L2 (actual position W2), resulting in the offset amount (gap or deviation) W4. Then, the tractor 1 judges that there is a gap between the calculated vehicle position W1 and the scheduled traveling line L2, and steers the tractor 1 to the left so that the offset amount W4 between the calculated vehicle position W1 and the scheduled traveling line L2 is eliminated. Then, the actual position W2 of the tractor 1 shifts to the scheduled traveling line L2 by steering left. Then, it is supposed that the operator notices that the tractor 1 has shifted from the scheduled traveling line L2 and steers the second corrector portion 53B at position P21 to increase the right correction amount from zero. The right-hand correction is added to the calculated vehicle position W1, and the corrected vehicle position W3 can be made to be substantially the same as the actual position W2. In other words, the vehicle position of the positioning system 40 can be corrected by the second corrector portion 53B in the direction to eliminate the offset amount W4 that occurred in the vicinity of the position P20. As shown in position P21 in FIG. 5A, when the actual position W2 of the tractor 1 is far to the left of the scheduled traveling line L2 after the vehicle position correction, the tractor 1 can be steered to the right to bring the actual position W2 of the tractor 1 in line with the scheduled traveling line L2.

Figure 5B:
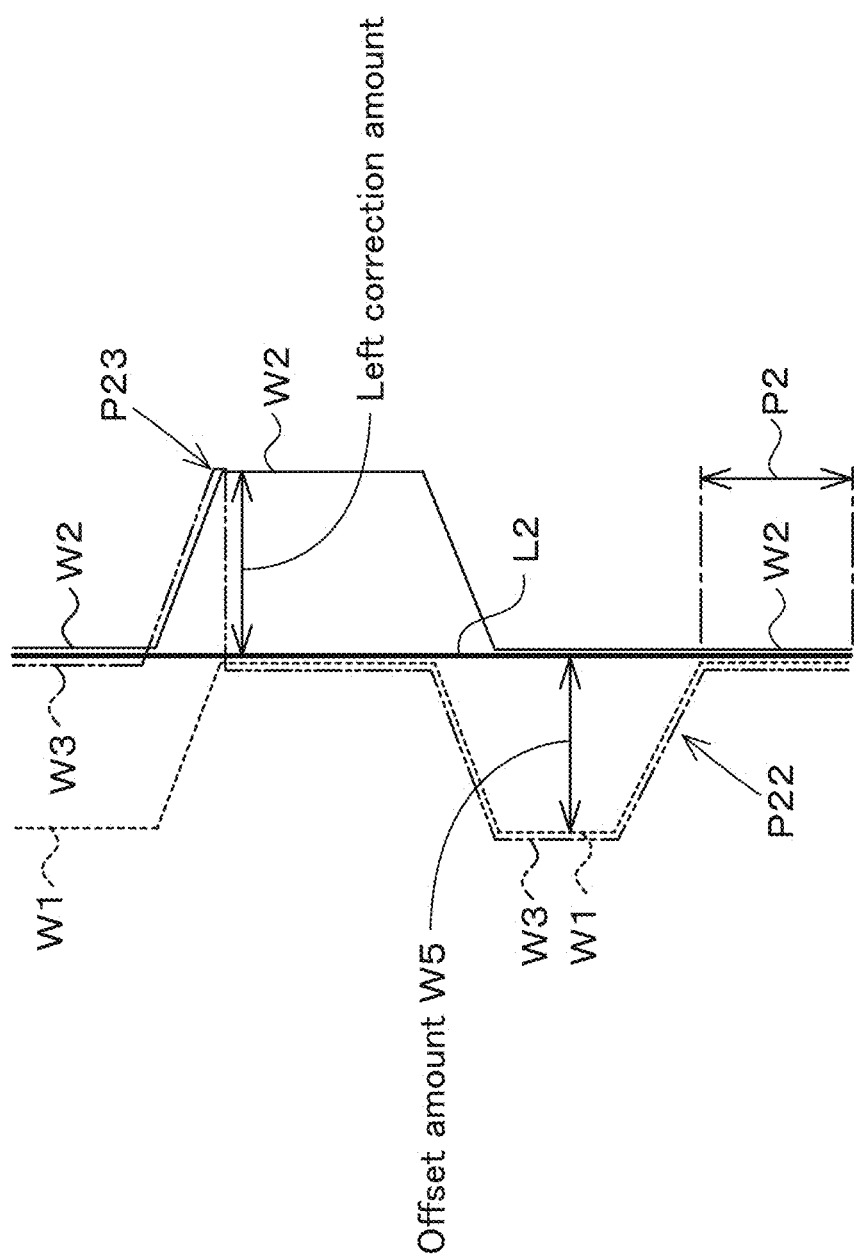
FIG. 5B is a view illustrating a state where a calculated body position is offset leftward during straight traveling in automatic steering.

FIG. 5B shows a case in which the calculated vehicle position W1 shifts to the left while the vehicle is moving straight ahead during the automatic steering. As shown in FIG. 5B, when the actual position W2 and the calculated vehicle position W1 coincide with the actual position W2 and the scheduled traveling line L2 at the start of the automatic steering, as in FIG. 5A, the tractor 1 travels along the scheduled traveling line L2, as in FIG. 5A. That is, as in FIG. 5A, in the sector P2 where there is no error in the positioning of the positioning device 40, tractor 1 travels along the scheduled traveling line L2. Also, as in FIG. 5A, the calculated vehicle position W1 and the corrected body position W3 are the same value.

When, at position P22, due to various effects, there is an error in the positioning of the positioning device 40, and the vehicle position W1 detected by the positioning device 40 is shifted to the left side relative to the actual position W2, and the offset amount (gap or deviation) W5 is maintained, then the tractor 1 resolves the offset amount W5 between the calculated vehicle position W1 and the scheduled traveling line L2. The tractor 1 is steered to the right so as to do so. Then, it is supposed that the operator notices that tractor 1 is out of alignment with the scheduled traveling line L2 and the operator steers the first corrector portion 53A at position P23 to increase the left correction amount from zero. Then, the left correction amount is added to the calculated vehicle position W1, and the corrected vehicle position (corrected body position) W3 can be made substantially the same as the actual position W2. In other words, by setting the left correction amount using the first corrector portion 53A, the vehicle position of the positioning system 40 can be corrected in a direction that eliminates the offset amount W5 that occurred in the vicinity of position P22. As shown in position P23 in FIG. 5B, when the actual position W2 of the tractor 1 is far to the right of the scheduled traveling line L2 after the vehicle position correction, the tractor 1 can be steered to the left to bring the actual position W2 of the tractor 1 in line with the scheduled traveling line L2.

Next, the setter switch 51 and the corrector switch 53 will be described.

Figure 6:
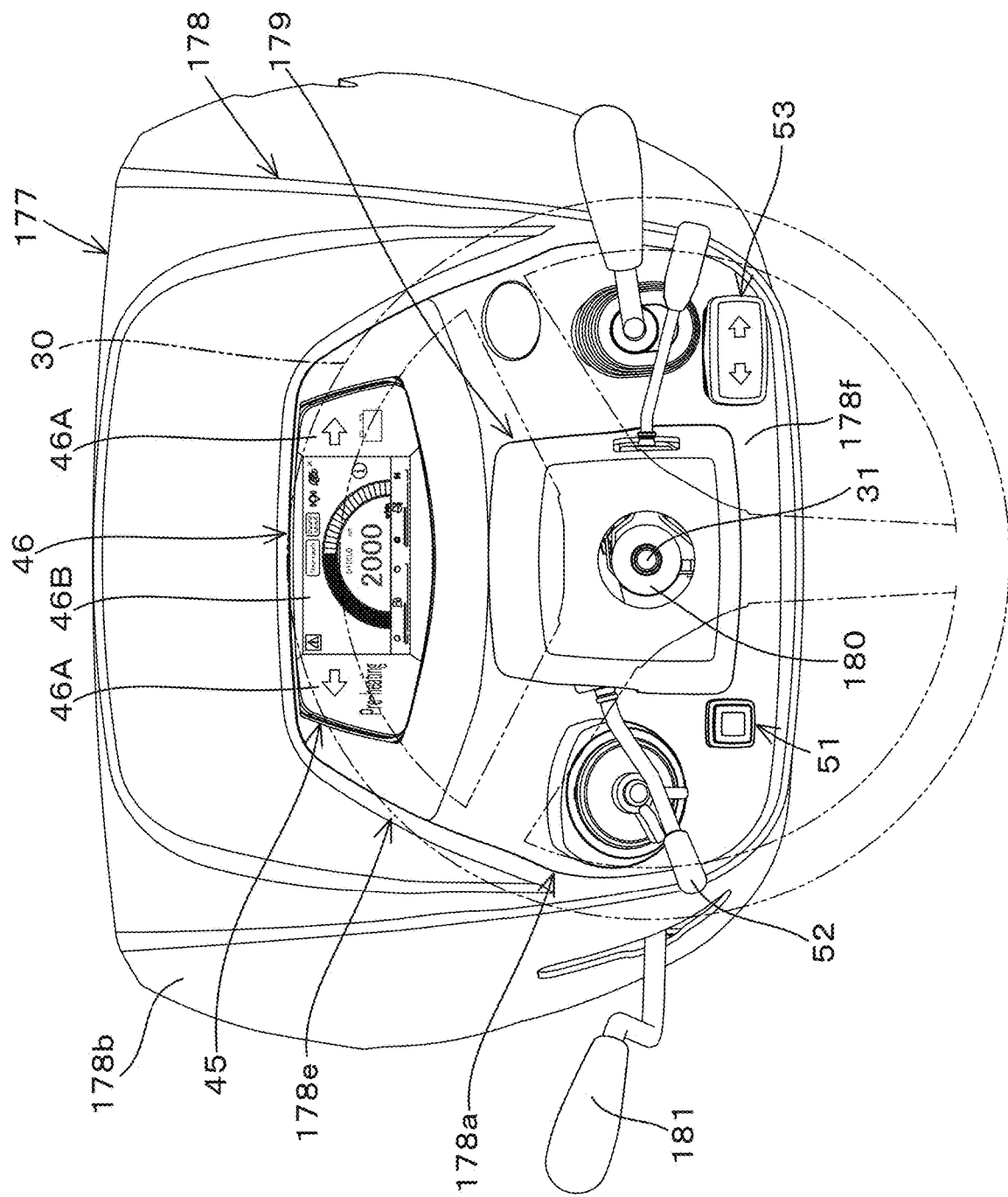
FIG. 6 is a view of a cover provided in front of an operator seat, which is seen from an operator seat side.

As shown in FIG. 6, the outer perimeter of the steering shaft 31 is covered by the steering post 180. The outer perimeter of the steering post 180 is covered by a cover 177. The cover 177 is provided in front of the operator seat 10. The cover 177 includes a panel cover 178 and a column cover 179.

The panel cover 178 supports the display device 45. The upper panel portion 178a of the panel cover 178 is provided with a support portion 178e that supports the display device 45. The support portion 178e supports the display device 45 in front of the steering shaft 31 and below the steering handle 30. The upper plate portion 178a has an attachment surface 178f to which the setter switch 51 and the corrector switch 53 are attached. The attachment surface 178f is located behind the support portion 178e and below the steering handle 30. The support portion 178e and the attachment surface 178f are continuous, with the support portion 178e located in front of the upper plate portion 178a and the attachment surface 178f located at the rear portion of the upper plate portion 178a. The setter switch 51 and corrector switch 53 are mounted on the attachment surface 178f. The setter switch 51 and the corrector switch 53 are thus arranged around the steering shaft 31.

A shuttle lever 181 protrudes from the left plate portion 178b of the panel cover 178. The shuttle lever 181 switches the direction of traveling of the vehicle body 3. In more detail, by operating (pivoting) the shuttle lever 181 forward, the forward/backward switching portion 13 is in a state of outputting the forward traveling power to the traveling device 7, and the traveling direction of the vehicle body 3 is switched to a forward traveling direction. By operating (pivoting) the shuttle lever 181 backward, the forward/backward switching portion 13 outputs backward traveling power to the traveling device 7, and the traveling direction of the vehicle body 3 is switched to the backward traveling direction. When the shuttle lever 181 is in the neutral position, no power is output to the traveling device 7.

The column cover 179 is disposed below the steering wheel and covers the outer perimeter of the upper portion of the steering shaft 31. The column cover 179 preferably has a substantially square cylinder shape and protrudes upward from the attachment surface 178f of the panel cover 178. In other words, the attachment surface 178f is provided around the perimeter of the column cover 179. Thus, the setter switch 51 and corrector switch 53 mounted on the attachment surface 178f are located around the perimeter of the column cover 179.

Next, the arrangement of the setter switch 51, the steering changeover switch 52, and the corrector switch 53 will be described in detail. As shown in FIG. 6, the setter switch 51, the steering changeover switch 52, and the corrector switch 53 are arranged around the steering shaft 31.

The setter switch 51 is located on one side (left side) of the steering shaft 31. The steering changeover switch 52 is located on one side (left side) of the steering shaft 31. In the case of this preferred embodiment, the steering changeover switch 52 includes a pivotable lever. The steering changeover switch 52 is pivotable with a base point on the steering shaft 31 side. The base end of the steering changeover switch 52 is provided inside the column cover 179. The steering changeover switch 52 protrudes on one side (left side) of the column cover 179.

The corrector switch 53 is located on the other side (right side) of the steering shaft 31. More specifically, the corrector switch 53 is disposed on the right side and rearward (diagonally right rearward) of the steering shaft 31. The corrector switch 53 is disposed to the right and rear (diagonally right rear) of the column cover 179 in relation to the column cover 179. The corrector switch 53 is disposed at the right rear portion of the attachment surface 178f in relation to the attachment surface 178f of the panel cover 178. The fact that the corrector switch 53 is disposed at the rear portion of the inclined attachment surface 178f allows for a longer distance between the corrector switch 53 and the steering wheel 30. This can more reliably prevent unintentional operation of the corrector switch 53 and steering wheel 30.

As mentioned above, the setter switch 51, the steering changeover switch 52, the corrector switch 53 are arranged around the steering shaft 31. In other words, the setter switch 51, the steering changeover switch 52, and the corrector switch 53 are present in a centralized location around the steering shaft 31. Thus, the operator can clearly understand the location of each switch at a glance. In addition, the operator can operate each switch without changing his or her posture while seated on the operator seat 10. As a result, the operability of the switches is improved and erroneous operation can be prevented. In addition, the harnesses (wiring) distributed from each switch can be shortened.

In addition, the above-mentioned switch arrangement may be arranged with the left and right sides interchangeable. That is, one side may be on the left and the other side on the right, or one side may be on the right and the other side on the left. In particular, for example, the setter switch 51 and the steering changeover switch 52 may be located on the right side of the steering shaft 31, and the corrector switch 53 may be located on the left side of the steering shaft 31.

As shown in FIG. 1, the tractor 1 is provided with a plurality of controller devices 60. The plurality of controller devices 60 control the traveling system, control the working system, calculate the vehicle position, and the like in the tractor 1. The plurality of controller devices 60 preferably include a first controller device 60A, a second controller device 60B, and a third controller device 60C.

The first controller device 60A receives the satellite signal received by the receiver 41 (received information) and the measurement information (acceleration, angular velocity, and the like) measured by the inertial measurement device 42, and determines the vehicle body position based on the received information and the measurement information. For example, when the correction amount by the corrector switch 53 is zero, that is, the correction of the vehicle position by the corrector switch 53 is not commanded, the first controller device 60A does not correct the calculated vehicle position W1 calculated based on the received information and the measurement information, and determines the calculated vehicle position W1 as the vehicle position to be used for the automatic steering. On the other hand, when the corrector switch 53 is commanded to correct the vehicle body position, the first controller device 60A sets the correction amount of the vehicle body position based on either the number of operations of the corrector switch 53 or the amount of operation of the corrector switch 53 (displacement amount), and then determines, as the vehicle position to be used for the automatic steering, the corrected vehicle position W3 obtained by correcting the calculated vehicle body position W1 with the correction amount.

The first controller device 60A sets a control signal based on the vehicle position (calculated vehicle position W1, corrected body position W3) and the scheduled traveling line L2, and outputs the control signal to the second controller device 60B. The second controller device 60B includes an automatic steering controller portion 200. The automatic steering controller portion 200 includes an electrical and electronic circuit in the second controller device 60B, a computer program stored in a CPU, and the like. The automatic steering controller portion 200 controls the steering motor 38 of the automatic steering mechanism 37 so that the vehicle body 3 travels along the scheduled traveling line L2 based on a control signal output from the first controller device 60A.

Figure 7:
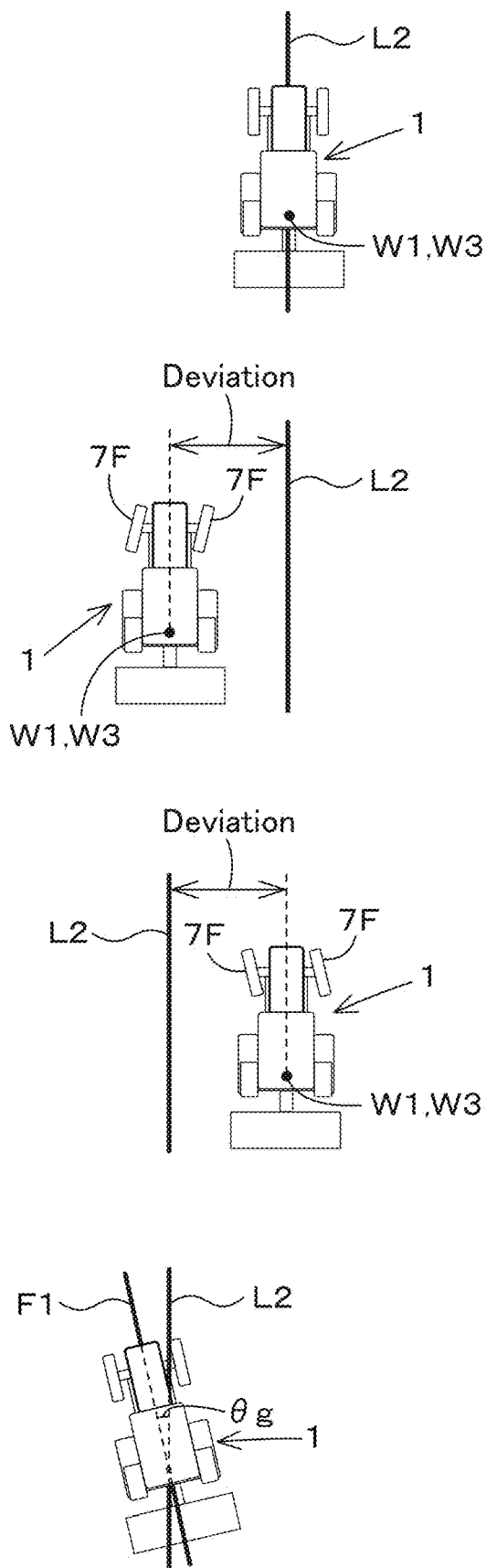
FIG. 7 is an explanation view explaining controls in automatic steering.

As shown in FIG. 7, when the deviation between the vehicle position and the scheduled traveling line L2 is less than a threshold value, the automatic steering controller portion 200 maintains the rotation angle of the rotation axis of the steering motor 38. When the deviation between the vehicle body position and the scheduled traveling line L2 (position deviation) is greater than or equal to the threshold value and the tractor 1 is located on the left side with respect to the scheduled traveling line L2, the automatic steering controller portion 200 rotates the rotation axis of the steering motor 38 so that the steering direction of the tractor 1 is in the right direction. That is, the automatic steering controller portion 200 sets the steering angle in the right direction so that the position deviation is zero. When the deviation between the vehicle position and the scheduled traveling line L2 is greater than or equal to a threshold value and the tractor 1 is located on the right side with respect to the scheduled traveling line L2, the automatic steering controller portion 200 rotates the rotational axis of the steering motor 38 so that the steering direction of the tractor 1 is in a left direction. That is, the automatic steering controller portion 200 sets the steering angle in the left direction so that the position deviation is zero.

In the above-described preferred embodiment, the steering angle of the steering device 11 is changed based on the deviation between the vehicle body position and the scheduled traveling line L2. However, when the orientation of the scheduled traveling line L2 differs from the orientation of the direction of the tractor 1 (vehicle body 3) in the direction of travel (traveling direction) (vehicle body orientation) F1, that is, the vehicle body orientation to the scheduled traveling line L2. When the angle θg of F1 is greater than or equal to a threshold value, the automatic steering controller portion 200 may set the steering angle so that the angle θg becomes zero (vehicle orientation F1 matches the orientation of the scheduled traveling line L2). The automatic steering controller portion 200 may also set a final steering angle in the automatic steering based on the steering angle obtained based on the deviation (position deviation) and the steering angle obtained based on the orientation (orientational deviation). The setting of the steering angle in the automatic steering in the above-described preferred embodiments is an example and is not limited thereto.

The third controller device 60C lifts and lowers the lifter device 8 in response to the operation of an operation member provided around the operator seat 10. The controller device 60, such as the third controller device 60C, is connected to a lifter switch 101. The lifter switch 101 is located around the operator seat 10 and is a three-position switch. When the lifter switch 101 is switched from the neutral position to one side, a lifting signal to lift the lifter device 8 (lift arm 8a) is input to the third controller device 60C. When the lifter switch 101 is switched from the neutral position to the other, a lowering signal to lower the lifter device 8 (the lift arm 8a) is input to the third controller device 60C. When the third controller device 60C obtains the lifting signal, the third controller device 60C lifts the lifter device 8 by outputting a control signal to the control valve 29, and when the lowering signal is obtained, the third controller device 60C lowers the lifter device 8 by outputting a control signal to the control valve 29. In other words, the third controller device 60C can perform the manual lifting and the lowering control to lift and lower the lifter device 8 in response to the manual operation of the lifter switch 101. The first controller device 60A, the second controller device 60B, and the third controller device 60C may be integrated. The control of the traveling system, the control of the working system, and the calculation of the vehicle body position as described above are not limited thereto.

Figure 9:
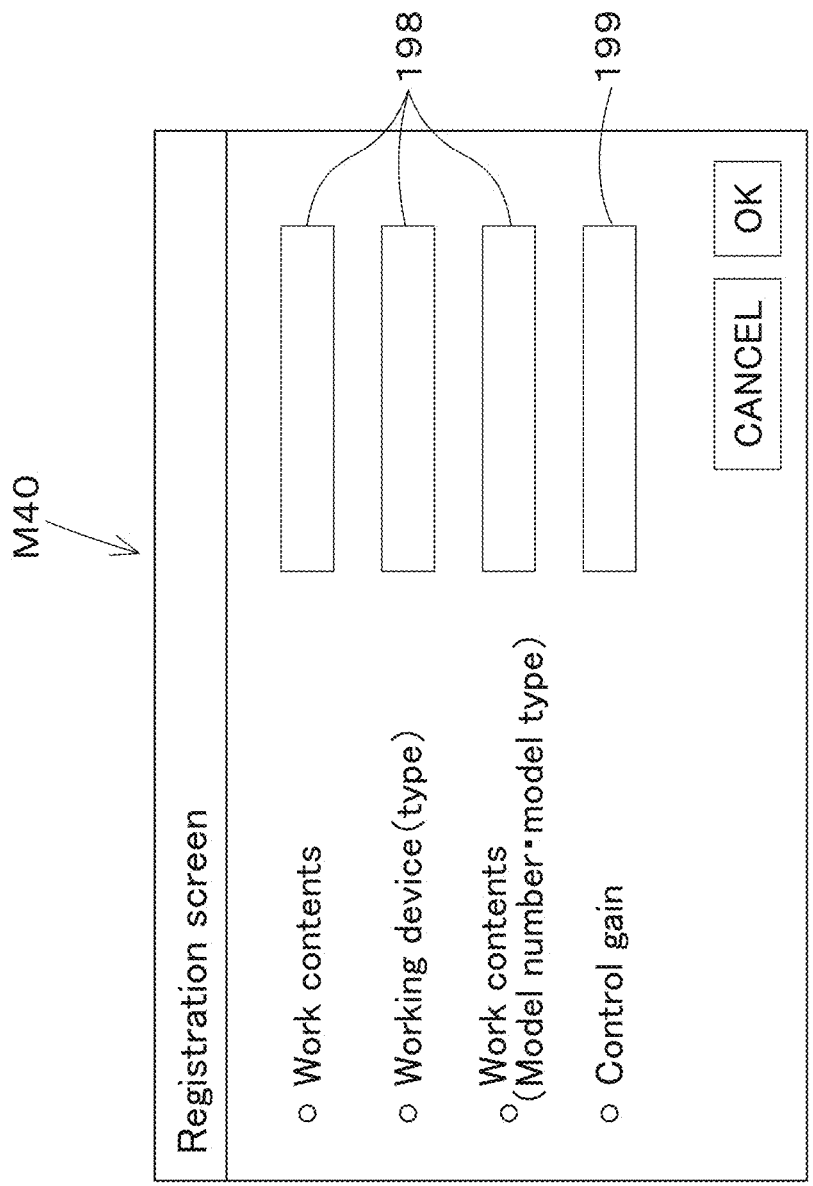
FIG. 9 is a view illustrating an example of a registration screen M40.

Now, the controller device 60 changes the control of the automatic steering based on the working device 2 coupled to the vehicle body 3. The working device 2 coupled to the vehicle body 3 can be displayed and input by the display device 45. As shown in FIG. 9, when a predetermined operation is performed on the display device 45, the display device 45 displays the registration screen M40 of the working device 2. The registration screen M40 displays an information input portion 198 for entering information about the working device 2 (device information). In the information input portion 168, the work content of the working device 2, such as tillage, fertilizer splaying, pesticide splaying, harvesting, mowing, tedding, raking, baling and the like, can be inputted into the information input portion 168. In addition, the type of working device 2, the type of the working device 2, the tiller device, the fertilizer sprayer device, the pesticide sprayer device, the harvester device, the mower device, the tedder device, the raking device, the baler device and the like can be entered to the information input portion 168. The model number and type of the working device 2 and the like may be entered to the information input portion 168.

The registration screen M40 displays a control input portion 199 to enable entry of information about a control parameter (control information). The control information is information of a control parameter to obtain a steering angle when the automatic steering is performed, for example, a value of a control gain G1 or a value corresponding to the control gain G1 can be entered as a control parameter. The input of the control gain to the control input portion 199 may be the value of the control gain itself, or instead of the control gain G1, the working load on the ground such as the work field in the working device 2 (a ground work load) may be input in numbers or the like, and then the input ground work load may be converted to the control gain G1. The ground work load is a numerical value of the load on the working device 2 when the work is performed on the ground by the working device 2. For example, when the ground work load of the working device 2 directly acts on the ground, such as plowing, ridging, and the like, is high, and when the working device 2 does not directly act on the ground, such as chemical spraying, and the like, the ground work load is low. The higher the ground work load, the higher the control gain G1 is and the lower the control gain G1 is. When converting the ground work load to the control gain G1, the higher the ground work load, the higher the control gain G1 is, and the lower the ground work load is, the lower the control gain G1 is.

The device information entered into the registration screen M40 and the control information about the control parameters are associated and stored in the storage device 81 provided in the tractor 1, as shown in FIG. 9. That is, the storage device 81 stores the control parameters entered into the display device 45 and the working device 2 in association with the control parameters entered into the display device 45.

As shown in FIG. 1, the automatic steering controller portion 200 includes a parameter changer portion 200d, a steering angle calculator portion 200b, and a steering controller portion 200c. The parameter changer portion 200d, the steering angle calculator portion 200b, and the steering controller portion 200c include electrical and electronic components provided in the controller device 60, a program incorporated in the controller device 60, and the like.

The parameter changer portion 200d changes the parameters applied in the automatic steering based on the working device 2. For example, when the work performed by the working device 2 is the chemical spraying, the chemical is often sprayed from above the work field, and when the working device 2 is a chemical sprayer device, the work load on the ground is small because the chemical sprayer device rarely comes into direct contact with the work field. In such a case, when the tractor 1 (vehicle body 3) is steered, the traveling direction of the tractor 1 can easily be changed according to the steering angle. Thus, the parameter changer portion 200d reduces the control gain when the working device 2 is a chemical sprayer device with a low ground work load.

On the other hand, for example, when the work performed by the working device 2 is tillage, the soil in the work field is directly caused, and when the working device 2 is a tillage device, the workload on the ground is high because the tillage device often comes into direct contact with the work field. In such a case, when the tractor 1 (vehicle body 3) is steered, it is difficult to change the traveling direction of the tractor 1 according to the steering angle. Thus, the parameter changer portion 200d increases the control gain when the working device 2 is a cultivator with a large ground work load.

The correction of the parameters and automatic steering by the parameter changer portion 200d will be described in detail below.

Figure 10:
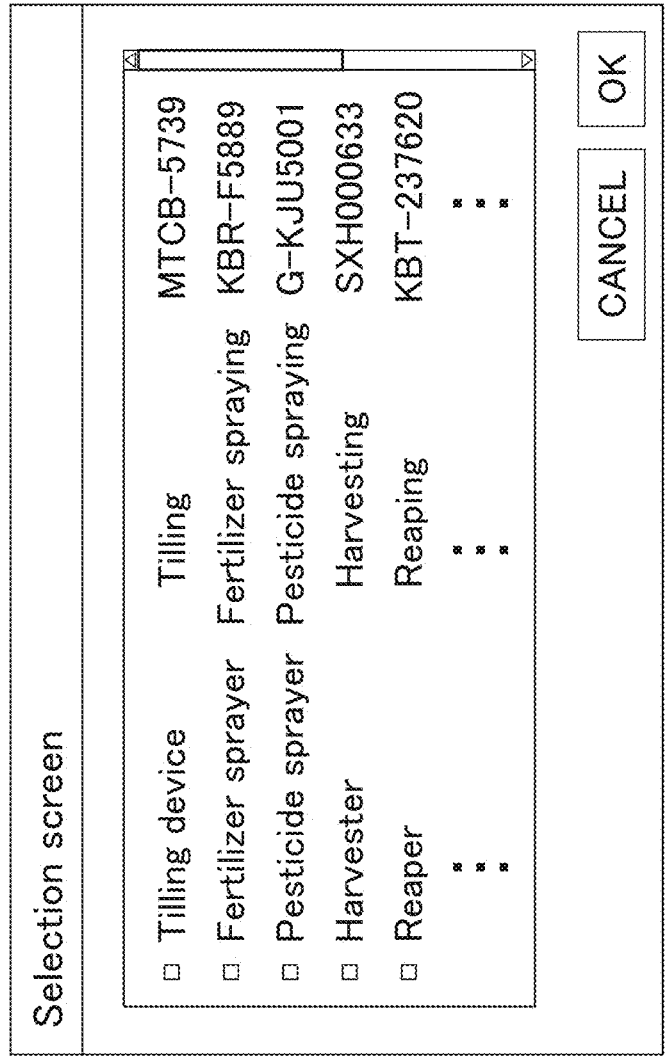
FIG. 10 is a view illustrating an example of a selector screen M41.

In automatic steering, when the operator (driver operator) performs a predetermined operation on the display device 45, the display device 45 displays a selection screen M41, as shown in FIG. 10. The selection screen M41 displays a list of device information and control information stored in the storage device 81. In the selection screen M41, when the operator selects device information corresponding to the working device 2 mounted on the vehicle body 3 (such as the work content, type, and model number of the working device 2), the value of the control gain G1 corresponding to the selected device information or the value corresponding to the control gain G1 (ground work load) is determined.

The parameter changer portion 200*d* sets the control gain G1 to be used during the automatic steering according to the control gain G1 determined on the selection screen M41 or the work load on the ground corresponding to the control gain G1. In other words, the parameter changer portion 200*d* changes the control parameter (control gain G1) based on the device information of the working device 2 stored in the storage device 81. For example, when the working device 2 is a tiller, the control gain G1 is set to 1.5, and when the working device 2 is a chemical sprayer device, the control gain G1 is set to 0.8.

The steering angle calculator portion 200*b* calculates the steering angle of the steering device 11 to reduce the deviation based on the deviation between the scheduled line L2 and the vehicle body 3 (the position deviation and the orientational deviation) and the parameters. In particular, the steering angle in the automatic steering is determined based on the position deviation between the vehicle body position (calculated vehicle body position W1 and corrected vehicle position W3) and the scheduled travel line L2, and the control gain G1 determined by the parameter changer portion 200*d*. The steering angle calculator portion 200*b* determines the steering angle by, for example, multiplying the position deviation by the control gain G1. The steering angle calculator portion 200*b* may use the control gain G1 to determine the steering angle, and the method for calculating the steering angle is not limited thereto.

Alternatively, the steering angle calculator portion 200*b* determines the steering angle in the automatic steering based on the orientational deviation between the vehicle orientation and the scheduled traveling line L2 and the control gain G1 determined by the parameter changer portion 200*d*. The steering angle calculator portion 200*b* obtains the steering angle by, for example, multiplying the orientational deviation by the control gain G1.

The steering controller portion 200*c* controls the steering device 11 based on the steering angle (calculated steering angle) calculated by the steering angle calculator portion 200*b*. As described above, the steering controller portion 200*c* controls the steering motor 38 so that when the tractor 1 is located on the left side with respect to the scheduled traveling line L2, the steering angle of the tractor 1 in the right direction is the calculated steering angle. The steering controller portion 200*c* controls the steering motor 38 so that the steering angle of the tractor 1 in the left direction of the tractor 1 is the arithmetic steering angle when the tractor 1 is located on the right side with respect to the scheduled traveling line L2, as described above.

Figure 11A:
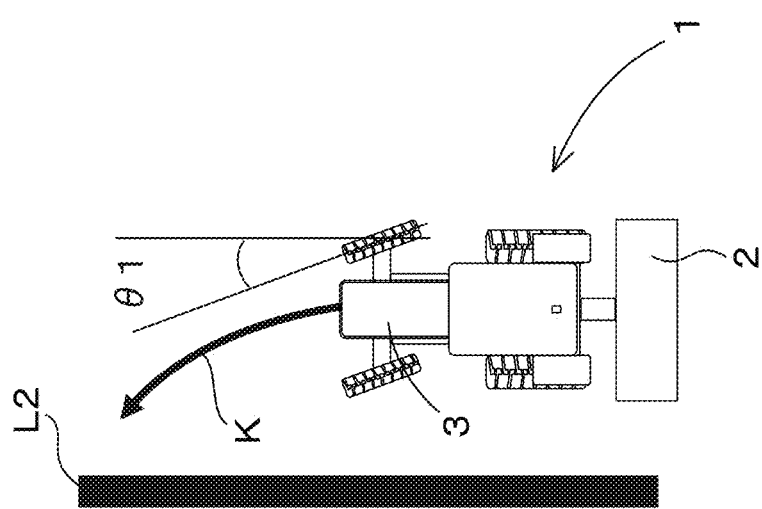
FIG. 11A is a view illustrating a state where a tractor performs an agricultural work without correcting a parameter (a control gain).

As shown in FIG. 11A, when the tractor 1 is working with the cultivator that has a large workload on the ground, when the tractor 1 is steered at a steering angle θ1 without correcting the control gain G1, the traveling direction of the tractor 1 is small because the vehicle body 3 of the traveling vehicle has a large penetration of the cultivator into the ground. As a result, the tractor 1 will remain in a position before the planned travel line L2.

Figure 11B:
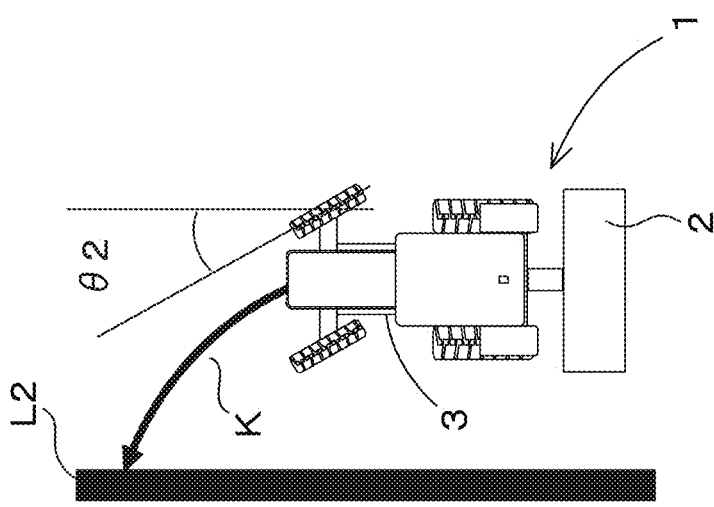
FIG. 11B is a view illustrating a state where a tractor performs an agricultural work without a parameter (a control gain) corrected.

On the other hand, suppose that when the tractor 1 is working on the cultivator device with a large ground work load, the control gain G1 is changed by the parameter changer portion 200*d*, and the steering angle θ2 in the automatic steering is larger than the steering angle θ1 in FIG. 11A, as shown in FIG. 11B. In this case, since the steering angle θ2 is set to a larger steering angle θ1 than θ2, it is easier to change the direction of travel of the tractor 1 and to make the travel trajectory K coincide with the planned travel line L2, even when the plowing device enters the ground to a large extent.

In the above-described preferred embodiment, the plowing device and the chemical sprayer device are described, but they are merely examples and preferred embodiments of the present invention are not limited thereto. In addition, the control gain and other values are merely examples and preferred embodiments of the present invention are not limited as a matter of course.

In the above-described preferred embodiment, the control parameters were changed by inputting and displaying the device and the control information on the display device 45, but instead, the device information and other information may be obtained from the working device 2 wirelessly or by other means.

Figure 12:
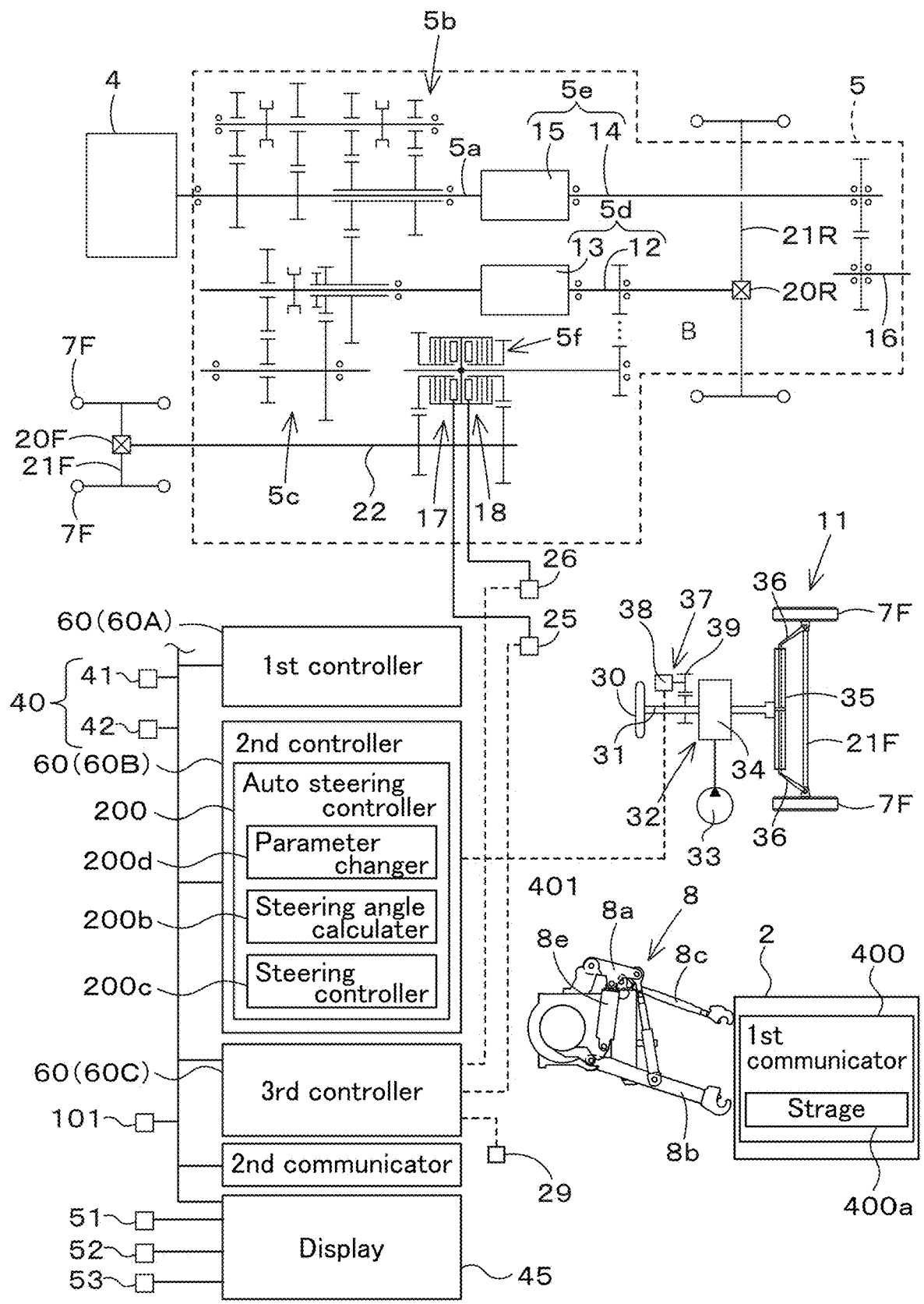
FIG. 12 is a view illustrating a control block diagram and configuration of a tractor according to a modified example.

FIG. 12 shows a block diagram of a modified example of a case where the device information is obtained from working device 2 wirelessly or by other means. As shown in FIG. 12, a first communicator device 400 is attached to the working device 2. The first communicator device 400 transmits the device information wirelessly preferably using communication standards such as Wi-Fi (Wireless Fidelity, registered trademark), RFID tags, BLE (Bluetooth (registered trademark) Low Energy) of the IEEE 802.11 series, for example.

The first communicator device 400 includes a storage portion 400*a*. The storage portion 400*a* includes, for example, a non-volatile memory or the like, and stores device information such as work content, type, model number, and the like. The first communicator device 400 transmits the device information stored in the storage portion 400*a* to the second communicator device 410 when, for example, there is a request or the like from the second communicator device 410 provided on the vehicle body 3 side.

The second communicator device 410 is attached to the vehicle body 3. The second communicator device 410 is a device is capable of receiving the device information transmitted from the first communicator device 400, and is capable of receiving the device information transmitted from the first communicator device 400, and communicates wirelessly preferably using communication standards such as the IEEE 802.11 series Wi-Fi (Wireless Fidelity, registered trademark), RFID tags, BLE (Bluetooth (registered trademark) Low Energy), for example.

When the prime mover 4 is started or the automatic steering is started, the first communicator device 400 transmits the device information to the second communicator device 410. When the second communicator device 410 obtains the device information, the second communicator device 410 outputs the device information to the second controller device 60B. The parameter changer portion 200*d* of the second controller device 60B determines the control gain G1 based on the device information output from the second communicator device 410. For example, the parameter changer portion 200*d* has in advance a control table relating the device information and the control gain G1, and the control gain G1 corresponding to the device information output by the second communicator device 410 is obtained from the control table. That is, the parameter changer portion 200d changes the control gain G1 based on the device information received by the second communicator device 410.

In the preferred embodiment described above, the control parameters were changed based on the device information, but instead, the control parameters may be changed based on the height of the lifter device 8, that is, the height of the lift arm 8a. Depending on the working device 2, there is a height range of the lift arm 8a when performing the work. For example, when the working device 2 is a cultivator, a ridging device, and the like, the height of the lift arm 8a tends to be lower, and when the working device 2 is a chemical sprayer device, the height of the lift arm 8a tends to be higher. In other words, it is possible to estimate the working device 2 by the height of the lift arm 8a. As shown in FIG. 13, the parameter changer portion 200d has a conversion table showing the relationship between the height of the lift arm 8a and the control gain G1. When the automatic steering is performed and the steering angle is not an angle corresponding to the turning, the parameter changer portion 200d refers to the current height of the lift arm 8a and obtains the control gain G1 from the current height of the lift arm 8a and the conversion table. Alternatively, the parameter changer portion 200d refers to the current height of the lift arm 8a when switched to the start of the automatic steering by the steering changeover switch 52, and obtains the control gain G1 from the current height of the lift arm 8a and the conversion table. The height of the lift arm 8a may be determined by a height detector device that detects the height of the lift arm 8a, or it may be estimated from the control signal output to the control valve 29. The values shown in FIG. 13 are exemplified for convenience of the explanation and are not limited to the values described.

The working vehicle 1 includes the steering device 11 to steer the vehicle body 3, the working device 2 connected to the vehicle body 3, the automatic steering controller portion 200 to automatically steer the steering device 11 based on the deviation between the planned line of travel and the position of the vehicle body 3, and the parameter changer portion 200d to change the control parameters for the automatic steering according to a type of the working device 2 connected to the vehicle body 3. According to this configuration, for example, when the work is performed by the working device 2 connected to the working device 2 while traveling the vehicle body 2 in the automatic steering, the movement of the vehicle body 2 in the automatic steering can be changed according to the characteristics of the working device 2.

The working vehicle 1 includes the display device 45 that can display and input relationships between control parameters of automatic steering and the working device 2, and the storage device 81 that stores the relationships between the control parameters input in the display device 45 and the working device 2. Also, the parameter changer portion 200d can change the parameters according to the associations stored in the storage device 81 to change the control parameters via the storage device 81. According to this configuration, the relationships between the working device 2 and the control parameters corresponding to the working device 2 can be easily entered by the display device 45, and the relationships between the working device 2 and the control parameters stored in the storage device 81 can be checked.

The working vehicle 1 is provided with the first communicator portion 400, which is installed in the working device 2 and transmits the device information of the working device 2 to the vehicle body 3, and the second communicator portion 410, which is installed in the vehicle body 3 and can receive the device information transmitted from the first communicator portion 400. And, the parameter changer portion 200d is capable of changing the device information received by the second communicator portion 410. The control parameters are changed based on the information. According to this configuration, the device information of the working device 2 connected to the vehicle body 3 can be automatically acquired by the vehicle body 3, and the control parameters corresponding to the working device 2 can be easily set based on the acquired device information.

The working vehicle 1 includes the lifter device 8 including the lift arm 8a to lift and lower the working device 2, and the parameter changer portion 200d changes a control parameter based on the lifting height of the lift arm 8a. According to this configuration, the control parameters can be easily changed by the height of the lift arm 8a.

The parameter changer portion 200d changes the control gain to calculate the steering angle of the steering device 11 during the automatic steering as the control parameter. According to this configuration, the control gain, which is a control parameter, can easily be used to find the steering angle during the automatic steering.

The working vehicle 1 is provided with the steering changeover switch 52 to switch either the start or end of automatic steering, and the controller device 60 (second controller device 60B) starts the automatic steering by the steering device 11 when the start of automatic steering is switched with the steering changeover switch 52. According to this configuration, by simply switching the steering changeover switch 52, the automatic steering can be easily started or ended at the location where one wants to perform the automatic steering.

The working vehicle 1 is provided with the positioning device 40 capable of detecting the position of the vehicle body 3, the reference line setting switch that sets the position of the vehicle body 3 detected by the positioning device 40 to the start and end positions of the traveling reference line L1. Also, the automatic steering controller portion 200 sets the scheduled traveling line L2 based on the traveling reference line L1 at the start of the automatic steering with use of the steering changeover switch 52. According to this configuration, the setting of the traveling reference line L1 can be easily done, and the scheduled traveling line L2 can be easily set by the traveling reference line L1.

In the above description, preferred embodiments of the present invention and modifications thereof have been explained. However, all the features of the preferred embodiments and modifications thereof disclosed in this application should be considered merely as examples, and the preferred embodiments and modifications thereof do not restrict the present invention accordingly. A scope of the present invention is shown not in the above-described preferred embodiments but in the claims, and is intended to include all modifications within and equivalent to a scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
   a steering device to steer a vehicle body;
   a working device connected to the vehicle body;
   an automatic steering controller to perform automatic steering of the steering device based on a difference between a scheduled traveling line and a position of the vehicle body;
   a parameter changer to change a control parameter of the automatic steering depending on the working device connected to the vehicle body; and
   a lifter including a lift arm to lift the working device; wherein
   when the automatic steering is performed and a steering angle is not an angle corresponding to turning, the parameter changer changes the control parameter based on a lifting height of the lift arm, the control parameter being a parameter to obtain the steering angle in the automatic steering.

2. The working vehicle according to claim 1, further comprising:
   a display to which a relationship between the working device and the control parameter of the automatic steering is input to be displayed by the display; and
   a storage to store the relationship between the control parameter and the working device input to the display; wherein
   the parameter changer changes the control parameter based on the relationship stored in the storage.

3. The working vehicle according to claim 2, further comprising:
   a first communicator provided on the working device to transmit device information of the working device to the vehicle body; and
   a second communicator provided on the working device to receive the device information transmitted from the first communicator; wherein
   the parameter changer changes the control parameter based on the device information received by the second communicator.

4. The working vehicle according to claim 3, wherein the parameter changer changes a control gain to calculate the control parameter representing a steering angle of the steering device in the automatic steering.

5. The working vehicle according to claim 2, wherein the parameter changer changes a control gain to calculate the control parameter representing a steering angle of the steering device in the automatic steering.

6. The working vehicle according to claim 1, further comprising:
   a first communicator provided on the working device to transmit device information of the working device to the vehicle body; and
   a second communicator provided on the working device to receive the device information transmitted from the first communicator; wherein
   the parameter changer changes the control parameter based on the device information received by the second communicator.

7. The working vehicle according to claim 6, wherein the parameter changer changes a control gain to calculate the control parameter representing a steering angle of the steering device in the automatic steering.

8. The working vehicle according to claim 1, wherein the parameter changer changes a control gain to calculate the control parameter representing a steering angle of the steering device in the automatic steering.

9. The working vehicle according to claim 1, further comprising:
   a steering switch to switch the automatic steering between to be started and to be terminated; wherein
   the automatic steering controller starts the automatic steering by the steering device when the steering switch switches the automatic steering to be started.

10. The working vehicle according to claim 9, further comprising:
    a position detector to detect a position of the vehicle body; and
    a reference line setter switch to set the position of the vehicle body detected by the position detector to a start position and an end position of a traveling reference line; wherein
    the automatic steering controller sets the scheduled traveling line based on the traveling reference line when the steering switch starts the automatic steering.

* * * * *